United States Patent
Shah

(10) Patent No.: US 12,511,598 B1
(45) Date of Patent: Dec. 30, 2025

(54) AUTOWRAP ROBOTICS: HUMANOID AI FOR AUTONOMOUS VEHICLE SERVICE CENTERS

(71) Applicant: Raoul Shah, West Palm Beach, FL (US)

(72) Inventor: Raoul Shah, West Palm Beach, FL (US)

(73) Assignee: AutoWrap Robotics LLC

( * ) Notice: Subject to any disclaimer, the term of this patent is extended or adjusted under 35 U.S.C. 154(b) by 0 days.

(21) Appl. No.: 19/264,907

(22) Filed: Jul. 10, 2025

(51) Int. Cl.
| | |
|---|---|
| *G06Q 10/06* | (2023.01) |
| *B25J 11/00* | (2006.01) |
| *B25J 15/04* | (2006.01) |
| *B60S 5/00* | (2006.01) |
| *G06Q 10/0631* | (2023.01) |
| *G07C 5/08* | (2006.01) |

(52) U.S. Cl.
CPC ...... *G06Q 10/06313* (2013.01); *B25J 11/001* (2013.01); *B25J 15/0491* (2013.01); *B60S 5/00* (2013.01); *G07C 5/0808* (2013.01); *G07C 5/085* (2013.01)

(58) Field of Classification Search
CPC .............. G06Q 10/06313; B25J 11/001; B25J 15/0491; B60S 5/00; G07C 5/0808; G07C 5/085
See application file for complete search history.

(56) References Cited

U.S. PATENT DOCUMENTS

| | | | |
|---|---|---|---|
| 10,850,386 B2 * | 12/2020 | Berger | ................ B25J 19/0016 |
| 2020/0342420 A1 * | 10/2020 | Zatta | ........................ B60S 5/00 |

* cited by examiner

*Primary Examiner* — Michael V Kerrigan

(57) ABSTRACT

The AutoWrap Robotics Humanoid Service Center System is an innovative AI platform that autonomously manages vehicle service centers using a fleet of humanoid robots. It coordinates customer interaction, advanced diagnostics (including for EVs/SDVs) with Explainable AI, and autonomous vehicle repairs, alongside facility and outdoor maintenance. Integrating cutting-edge humanoid robots with sophisticated AI, machine learning, and multi-modal sensing, the platform provides semantic understanding of complex environments. It boosts service quality, reduces labor demands, and dramatically increases operational efficiency, transforming underperforming properties into highly productive autonomous centers. Key features include augmented reality interfaces, robust cybersecurity for in-vehicle networks and robot operations, predictive maintenance, and real-time, socially adaptive humanoid-mediated customer communication. Delivered as a scalable Software-as-a-Service (SaaS) solution, the system provides essential AI intelligence for fully autonomous, comprehensive, and sustainable vehicle servicing.

20 Claims, 6 Drawing Sheets

AUTOWRAP ROBOTICS: HUMANOID AI FOR AUTONOMOUS VEHICLE SERVICE CENTERS

FIELD OF THE INVENTION

The present invention relates generally to robotic automation, artificial intelligence software control systems, human-robot collaboration, and autonomous facility management. More specifically, it pertains to a computer-implemented AI software platform configured to autonomously orchestrate and control a fleet of humanoid robotic platforms (FIG. 1, 104) for the comprehensive operation of a vehicle service center (FIG. 1, 100), encompassing customer reception, vehicle diagnosis (including for internal combustion engine (ICE) vehicles, hybrid, and electric vehicles (EVs) from model year 2005 onwards), issue detection, and autonomous repair, multi-functional vehicle maintenance, internal logistics, and facility upkeep including outdoor premises management (e.g., parking lots, landscaped areas), whether performed in a dedicated fixed facility or extending services to on-site customer locations via mobile service units, while maintaining robust security against unauthorized access and theft, and providing advanced, real-time, personalized customer communication through humanoid robots.

BACKGROUND OF THE INVENTION

The automotive service industry, while a multi-billion dollar market, faces significant challenges including persistent labor shortages, escalating operational costs, inconsistencies in service quality, and increasing customer demand for speed and convenience. Traditional service centers are heavily reliant on human labor for virtually all tasks, from front-desk reception and scheduling to diverse maintenance procedures, parts management, and shop cleanup. Critically, complex diagnostic procedures and the subsequent execution of varied repair tasks often require highly skilled human technicians, leading to varying accuracy, efficiency, and significant labor costs. Furthermore, the rapid global transition to Electric Vehicles (EVs) and the proliferation of Software-Defined Vehicles (SDVs) introduce new complexities related to high-voltage systems, battery thermal management, charging infrastructure, and intricate software diagnostics and updates, which traditional service models are ill-equipped to handle efficiently. Beyond these general challenges, a significant portion of the existing automotive service infrastructure consists of underutilized or distressed assets-properties with valuable real estate, but operations hampered by inefficiencies, low throughput, high human error rates, and escalating challenges in labor quality and reliability. These facilities often represent substantial capital investments that fail to generate their full revenue potential due to the very operational complexities detailed herein.

The variability inherent in non-routine repairs, such as addressing corroded fasteners, damaged wiring, or non-standard component orientations, presents a major hurdle for conventional automation. This reliance limits scalability, introduces human variability into service quality, and often results in ergonomic injuries for technicians from repetitive or awkward tasks (e.g., crawling under vehicles, lifting tires). Furthermore, the customer experience in traditional service centers can often be opaque, with limited real-time updates on vehicle status, leading to frustration and perceived lack of transparency.

The upkeep of external premises, including parking lots, sidewalks, and landscaped areas, also requires significant manual labor and resources, impacting overall operational efficiency and customer perception.

Challenges in Integrated Service Center Operation

Operating a comprehensive automotive service center manually presents numerous complexities:

Customer Journey Management: Manual greeting, intake, scheduling, communication, and payment processes are prone to human error, bottlenecks, and inconsistent customer experience. Lack of transparent, real-time updates often diminishes customer satisfaction.

Diverse Maintenance and Repair Tasks: Routine maintenance and common repairs (e.g., oil changes, tire rotations, brake inspections, fluid top-offs, battery services) require varied tools, precise execution, and adaptation to countless vehicle models. More complex, non-routine repairs demand high diagnostic accuracy and adaptive physical intervention, often requiring problem-solving in the face of unforeseen conditions like rusted bolts, stripped threads, or corroded electrical connections. Servicing electric drivetrains, high-voltage battery systems, and intricate vehicle software systems adds further layers of complexity and specialized skill requirements.

Logistics and Inventory: Manual tracking and retrieval of parts, tools, and consumables lead to inefficiencies, misplaced items, and potential delays.

Shop Organization and Cleanliness: Maintaining a clean, organized, and safe working environment requires continuous effort, often diverting technicians from revenue-generating tasks. This extends to outdoor areas like parking lots, which require regular cleaning, debris removal, and landscaping to maintain a professional appearance and safety.

Resource Allocation: Dynamically assigning tasks to technicians and optimizing workflow across multiple bays and different service types is a complex scheduling challenge.

Safety and Ergonomics: Many tasks involve physically demanding postures, heavy lifting, or exposure to hazardous materials for human workers. Working with high-voltage EV components also introduces new safety challenges.

Security Risks: Manual operations are susceptible to human error in security protocols, potentially leading to unauthorized access, theft, or vandalism. The increasing connectivity of modern vehicles also presents new cybersecurity vulnerabilities, requiring secure interaction with in-vehicle networks and protection against malicious software injection.

Evolving Legal and Regulatory Landscape: As autonomous systems handle sensitive data (e.g., customer identity, vehicle diagnostics) and interact with public spaces (e.g., mobile service, outdoor cleaning), navigating evolving regulations around data privacy (e.g., GDPR, CCPA), liability for autonomous operations, and vehicle control interfaces (e.g., access to vehicle networks) presents significant challenges for commercialization. This includes adherence to emerging robotics safety standards (e.g., ISO 13482, ISO/TS 15066) and data governance related to Vehicle-to-Everything (V2X) communication and the "Right to Repair" movement.

These challenges underscore the need for a holistic, intelligent automation solution that can seamlessly integrate and manage all aspects of a modern vehicle service center, from initial issue detection to final repair verification, with integrated, proactive security measures, a highly transparent and engaging customer communication model, autonomous management of both indoor and outdoor facility aesthetics and functionality, and a framework adaptable to legal and regulatory evolution.

DESCRIPTION OF THE PRIOR ART

Conventional automotive service automation is typically compartmentalized, focusing on isolated tasks rather than integrated service center management. Examples include automated car washes, automated tire mounting machines, or specialized diagnostic equipment that still require human operation and interpretation. Industrial robots have seen limited use in repair due to their lack of mobility, generalized dexterity, and inability to adapt to the unstructured, variable environments of a service bay or customer-facing area. For instance, while robotic arms are used in manufacturing, their fixed positions and limited mobility, without a comprehensive AI software platform like the present invention to direct them, prevent them from navigating the unstructured, dynamic environments of a service bay to perform diverse, human-like tasks like handling vehicle keys, interacting with customers, or performing intricate diagnostic procedures on varied vehicle models.

While some AI systems exist for diagnostic purposes (e.g., analyzing sensor data or error codes), they typically provide recommendations to human technicians and lack the integrated software control to autonomously execute the physical repair. Similarly, some robotic systems can perform specific defect identification (e.g., paint surface defects) but lack the integrated intelligence to then autonomously implement a broad range of corresponding physical repairs across diverse vehicle components. Current customer communication platforms often rely on generic text updates or human phone calls, lacking real-time, context-aware interaction. Automated outdoor cleaning typically involves specialized, single-purpose robotic sweepers or mowers lacking the versatility for diverse debris or complex landscaping, and without integration into a holistic service management system.

Moreover, existing human-robot collaboration models primarily focus on safety and task segregation, with limited exploration into deeper, active cognitive and physical collaboration for complex problem-solving in dynamic, unstructured environments. Current humanoid robot development (e.g., by Boston Dynamics, Agility Robotics, Figure AI, Tesla) focuses on bipedal locomotion, dexterity, and navigation, but a comprehensive AI software platform for orchestrating a fleet of such robots to manage the full spectrum of tasks within a dynamic, customer-facing automotive service environment, including both direct vehicle interaction and indirect shop management tasks, with integrated, autonomous issue diagnosis and physical repair capabilities (even for variable conditions), robust security protocols, a humanoid-mediated real-time customer communication system, autonomous outdoor premises management within user-defined boundaries, and advanced human-robot collaboration extending to complex problem-solving and supervisory roles, represents an unaddressed void in the prior art.

No existing solution provides a unified AI brain for managing multi-functional humanoid robots to autonomously operate an entire service facility, from customer reception to vehicle repair and facility upkeep, and extending to mobile deployments, while simultaneously ensuring the security of vehicles and premises, including the secure handling of vehicle keys, and providing personalized, real-time status updates directly from humanoid robots, maintaining clean and organized outdoor customer areas within defined geographical boundaries, and facilitating advanced, synergistic collaboration with human experts.

BRIEF DESCRIPTION OF THE DRAWINGS

The accompanying drawings, which are incorporated in and constitute a part of this specification, illustrate various embodiments of the present invention and, together with the description, serve to explain the principles of the invention.

SUMMARY OF THE INVENTION

Overview of The Auto Wrap Robotics Humanoid Service Center System

Figure 1:
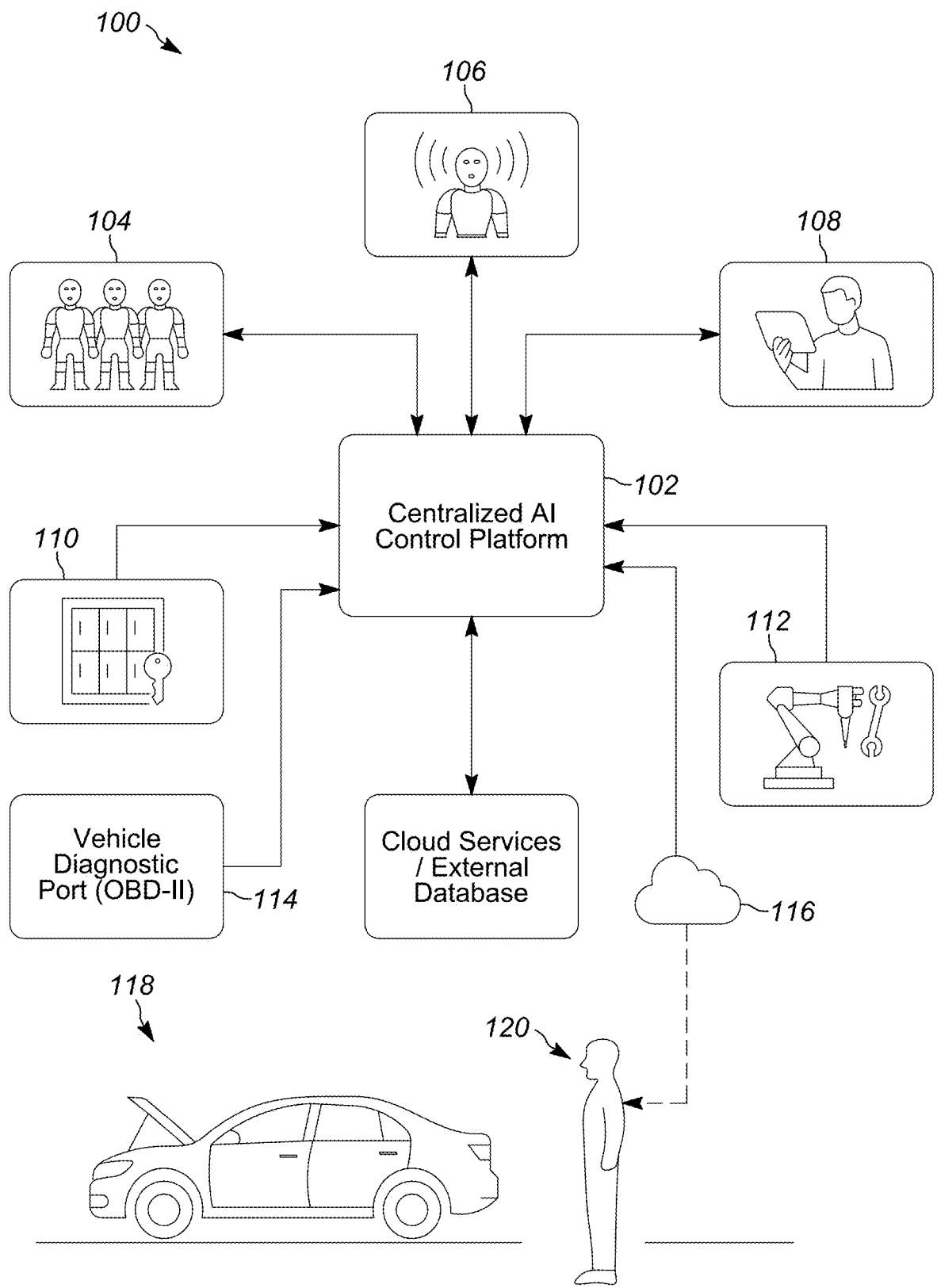
FIG. 1 is an overall system architecture diagram (1/6) providing a high-level overview of the AutoWrap Robotics Humanoid Service Center System (100). It depicts the Centralized AI Control Platform (102) as a central hub, interacting with a Fleet of Humanoid Robots (104), Multi-Modal Sensing (106), a User Interface/Supervisory Control (108), an Automated Key Storage System (110), an Automated Tool Magazine/Storage (112), a Vehicle Diagnostic Port (114), and Cloud Services/External Databases (116). A Vehicle in Service Bay (118) and a Customer (120) are shown for context.
Figure 6:
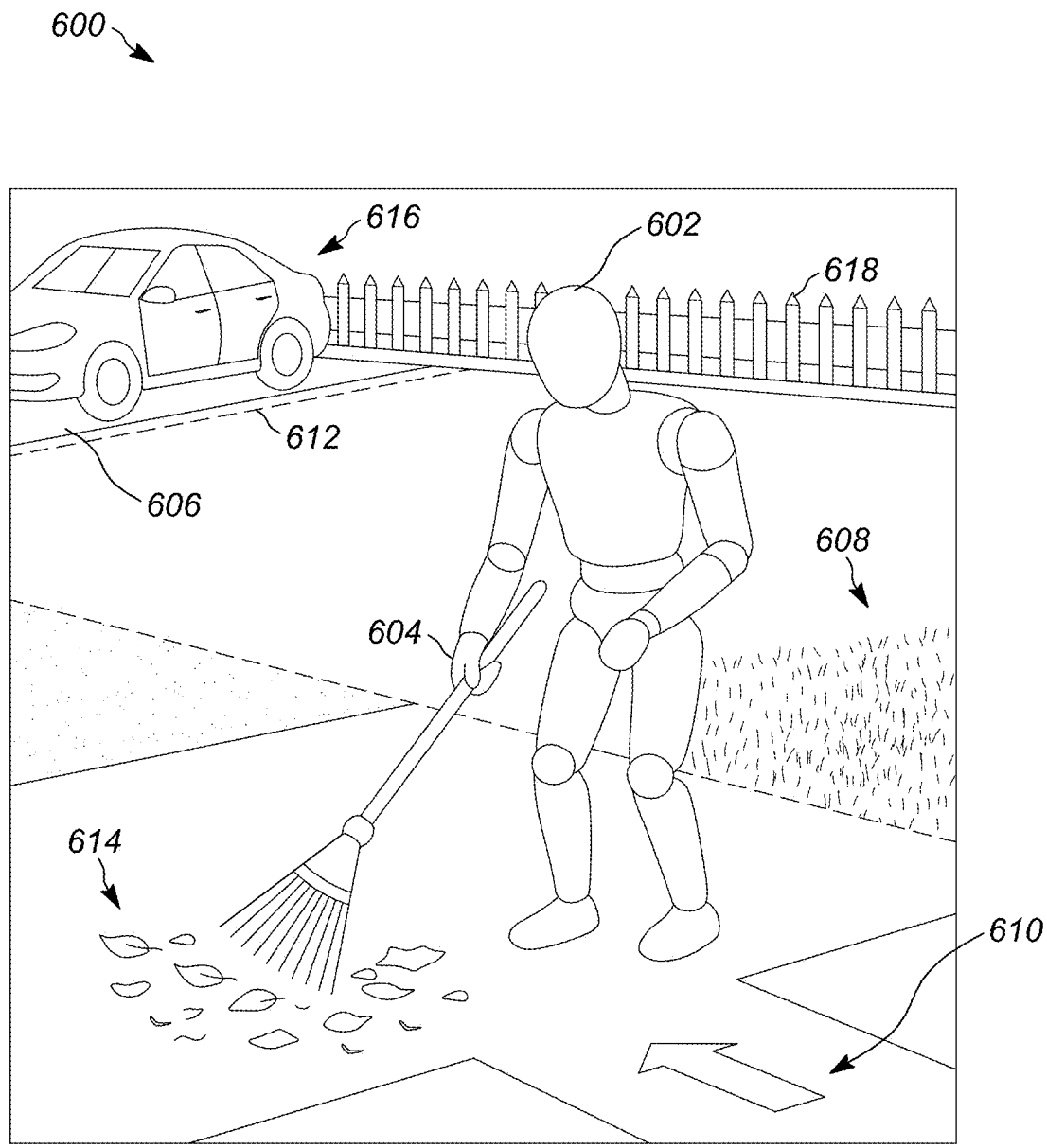
FIG. 6 is a scenario diagram (6/6) illustrating Autonomous Outdoor Premises Maintenance (600) by Humanoid Robot (602), equipped with Specialized End-Effector (604), operating in: Parking Lot/Paved Area (606); Grass/Landscaped Area (608); Walkway/Pathway (610); Collecting Debris/Litter (614). Also shown: Geospatial Boundary Line (612), Vehicle (616), Property Fence/Boundary (618).

The AutoWrap Robotics Humanoid Service Center System (100) represents a groundbreaking, autonomous solution specifically engineered for the comprehensive operation and management of an automotive service facility, as generally depicted in FIG. 1. This innovative system integrates a centralized AI control platform (102) that orchestrates a fleet of advanced humanoid robots (104) to perform a wide array of tasks, including customer reception and interaction, comprehensive vehicle diagnostics, autonomous issue identification and repair, routine vehicle maintenance (including, but not limited to, specialized tasks such as vehicle surface treatments like paint protection film and ceramic coatings, and other advanced vehicle customization services, such as autonomous interior lighting installations), internal shop logistics, and facility management, including autonomous outdoor area maintenance (e.g., sweeping parking lots, clearing debris from grass and tree areas, as shown in FIG. 6). This system extends its capabilities to both fixed service facilities and dynamic on-site or mobile deployment environments. Its primary objective is to fully automate a broad spectrum of operations traditionally performed manually, characterized by their complexity, physical demands, and demand for high precision and consistent customer experience, thereby transforming underperforming or mismanaged service centers into highly efficient, high-throughput, and consistently profitable autonomous operations.

Figure 5:
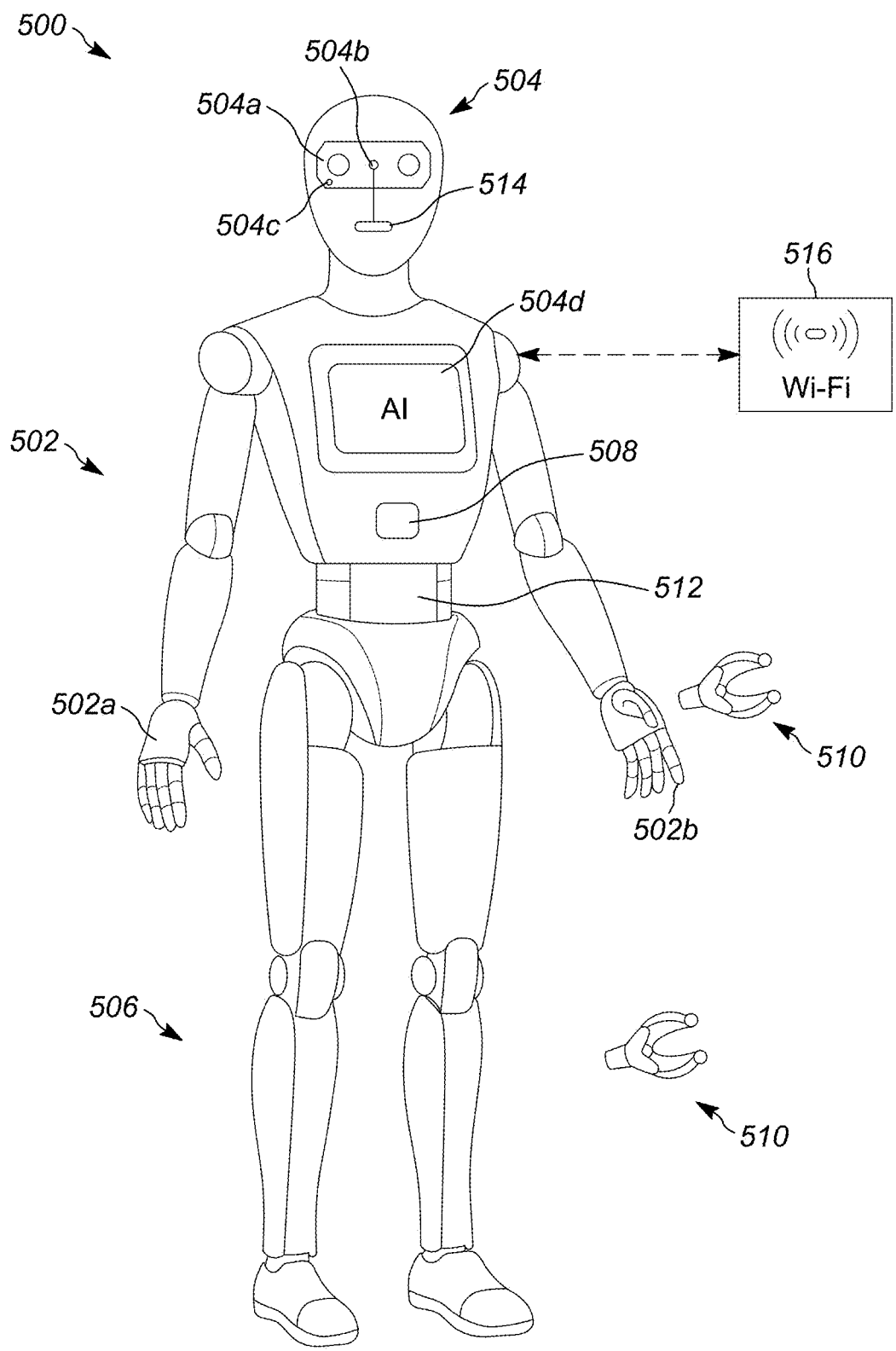
FIG. 5 is an anatomical/feature diagram (5/6) highlighting the key physical and sensory features of a generic Humanoid Robot (500), showing: Multi-Degree-of-Freedom Hand (502) with Force Sensor (502*a*) and Tactile Sensor (502*b*); Integrated Multi-Modal Sensing Head/Torso (504): 3D Vision System (504*a*), Thermal Camera (504*b*), Acoustic Sensor/Microphone (504*c*), Display Screen (504*d*); Bipedal Locomotion Legs/Articulations (506); On-Device AI Processing Unit (508); Interchangeable End-Effector (510); Power Source/Battery Pack (512); Speaker/Audio Output (514); Data Communication Module (516).

This is achieved through the seamless integration orchestrated by the AI software platform of state-of-the-art humanoid robotic platforms (e.g., as shown in FIG. 5), advanced artificial intelligence (AI) and machine learning (ML) algorithms (including Explainable AI for diagnostics, reinforcement learning for highly dexterous manipulation, and semantic understanding of the environment), comprehensive multi-modal sensing (106; 504—vision, tactile, force/torque, thermal, and acoustic), and specialized, autonomously interchangeable end-effectors (510) designed for diverse automotive and facility management tasks, with end-effectors equipped for self-diagnosis of wear and calibration drift, communicating proactively for replacement or autonomous adjustment. The system is meticulously designed to optimize workflow across an entire service center, reduce labor dependency, and provide unparalleled consistency, efficiency, and scalability in vehicle servicing and shop operations—all while implementing robust security measures to prevent unauthorized access and theft, and ensuring the safe handling of vehicle keys (110).

It further enables real-time, interactive, and personalized customer communication on vehicle status directly via humanoid robots (104, 120) (with emotion/sentiment recognition and adaptive social cues), adheres to user-defined geographical boundaries for robot operation and tool management, and facilitates advanced, synergistic human-robot collaboration for complex tasks (including Augmented Reality (AR) interfaces for human supervisors—108, 310). The system incorporates Digital Twins of vehicles and the service center for enhanced simulation and real-time monitoring and is structured to be delivered as a Software-as-a-Service (SaaS) platform for broader commercialization and rapid scalability. Moreover, the system's adaptable architecture and advanced diagnostic capabilities specifically address the unique requirements of servicing Electric Vehicles (EVs) and Software-Defined Vehicles (SDVs), ensuring future-proof functionality across diverse drivetrains and vehicle architectures, from model year 2005 onwards. The system is also configured to adhere to client-specific or proprietary service protocols and unique quality standards.

Key Innovations and Advantages

The AutoWrap Robotics Humanoid Service Center System (100) offers a compelling suite of innovations and advantages that address the limitations of manual vehicle service centers, specifically excelling in the rapid and scalable transformation of distressed or underperforming automotive service assets into highly profitable and efficiently managed entities:

Centralized AI Orchestration for Multi-Functional Humanoid Fleet

Figure 4:
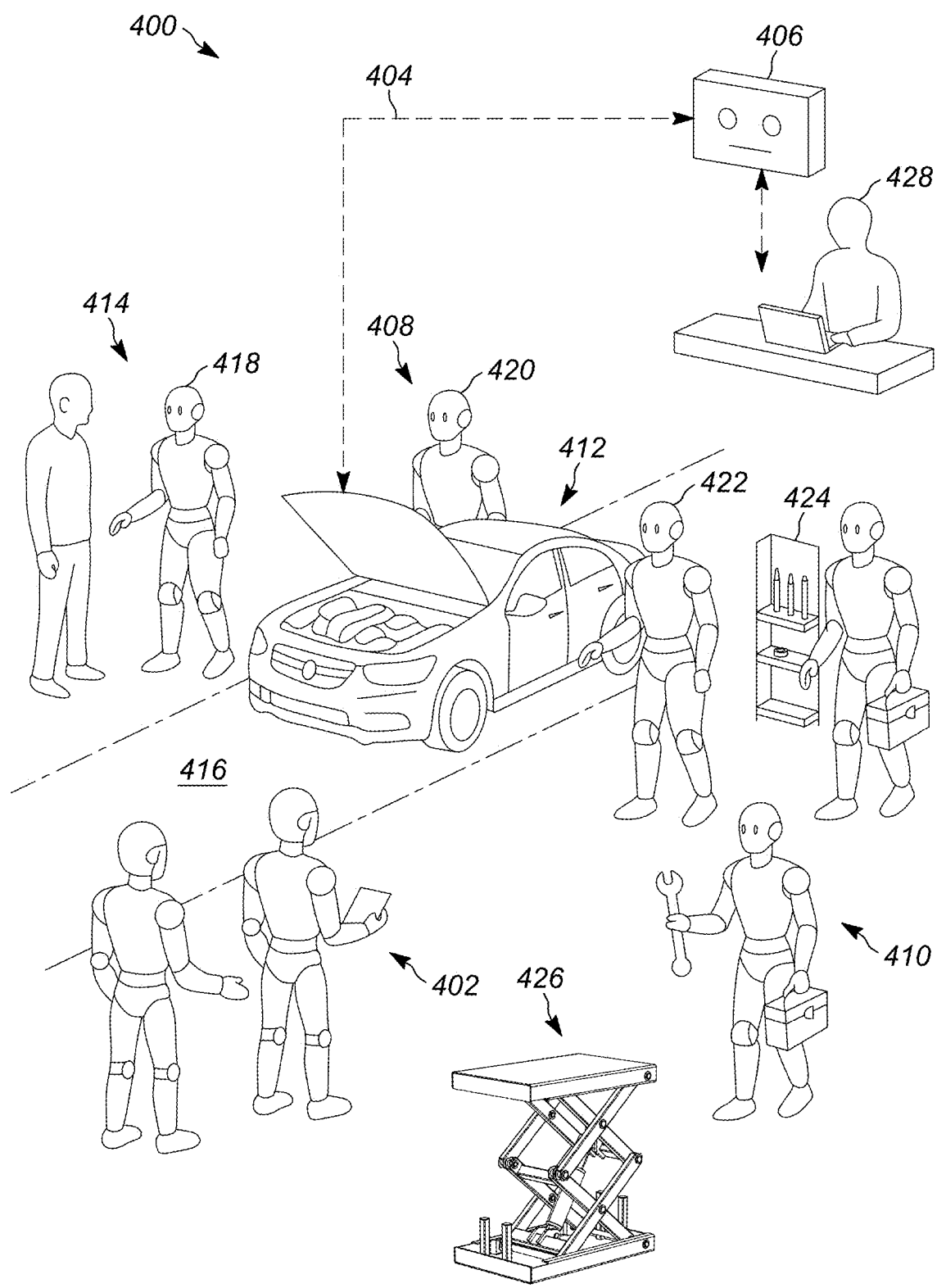
FIG. 4 is a scenario diagram (4/6) illustrating the Multi-Humanoid Robot Orchestrated Issue Diagnosis and Repair (400) process. It depicts: Humanoid Robot 1 (418): Customer Arrival & Initial Check-in (402), Vehicle Diagnostics & Issue Identification (404); Humanoid Robot 2 (420): Autonomous Physical Repair Execution (408) on Vehicle (412); Humanoid Robot 3 (422): Parts/Tool Retrieval & Delivery (410) from Tool Rack/Part Storage (424); Central AI (406): Orchestration; Human Supervisor (428): Optional oversight from Lift/Workstation (426).

A core innovation is the master AI control platform (102) that intelligently orchestrates a fleet of humanoid robots (104). This AI dynamically assigns tasks, optimizes robot pathways, manages inter-robot communication and collaboration (e.g., one humanoid robot preparing a vehicle while another retrieves parts, and a third greets a customer—as depicted in FIG. 4), balances workloads, and ensures the efficient flow of operations across the entire service center—from the front desk to the service bays and storage areas, including managing robot deployment for outdoor maintenance within designated areas (FIG. 6). Crucially, the AI continuously monitors the health and operational status of each individual robot within the fleet, detecting malfunctions or offline states and autonomously re-allocating tasks and dispatching assisting humanoid robots to address the issue, facilitating recovery or removal.

Humanoid Robotics for Universal Shop Roles

The system primarily leverages humanoid robots (e.g., Apptronik's Apollo, Agility Robotics' Digit, Figure AI, Tesla's Optimus—as exemplified by FIG. 5) due to their unparalleled versatility. Their human-like form factor, bipedal locomotion (506), dynamic posture adaptation, and multi-degree-of-freedom hands (502) enable a single type of robot to perform:

Customer-facing tasks: Greeting, guiding, communicating, and assisting with check-in/payment, including real-time status updates and personalized interactions (FIG. 4, 402).

Vehicle maintenance and repair tasks: As detailed in sections [0023] and [0028] (and illustrated in FIG. 4, 408), including autonomous issue diagnosis and physical repair.

Logistics tasks: Parts retrieval (FIG. 4, 410), inventory management, tool handling (112).

Shop and premises maintenance tasks: Cleaning, organizing, waste disposal, and autonomous cleaning and upkeep of outdoor customer areas (e.g., sweeping parking lots, clearing debris from grass and tree areas, as shown in FIG. 6).

This proactive approach prevents the accumulation of clutter and half-completed work common in manually operated, disorganized facilities, significantly improving overall shop aesthetics, safety, and operational flow. This includes precise handling and application of specialized vehicle customization materials such as vinyl wrap films, ceramic coating chemicals, and paint protection film rolls, minimizing waste and ensuring optimal application. This versatility significantly reduces the need for specialized, single-purpose machinery, offering unprecedented flexibility and efficiency.

DETAILED DESCRIPTION

Comprehensive Vehicle Diagnosis and Autonomous Repair Capabilities (Enhanced with XAI and Dexterous ML, EV/SDV Focus)

The humanoid robots (104), guided by the AI (102), perform advanced diagnostic and repair functions:
Automated Multi-Modal Diagnostics with Explainable AI Utilizing integrated vision (504a), thermal (504b), and acoustic sensors (504c), the system performs comprehensive inspections (204; 404). The Central AI (102, 302) processes this multi-modal sensor data (304), historical vehicle records, and OEM service data to precisely identify vehicle issues. Critically, the AI provides explainable diagnostic reasoning (306a), presenting not just the identified issue but also the rationale and supporting evidence (e.g., sensor readings, visual anomalies, correlation with known fault patterns) that led to its conclusion. This builds trust and facilitates human oversight.

The system is particularly adept at diagnosing both conventional internal combustion engine (ICE) vehicle issues and specialized Electric Vehicle (EV) and Software-Defined Vehicle (SDV) conditions, including battery health, thermal management, motor/inverter performance, and onboard software anomalies.
AI-Driven Issue Identification The AI (102) leverages its vast database of vehicle CAD models, OEM specifications, and prior repair histories, while critically relying on real-time multi-modal sensing (106) to detect specific vehicle configurations, current anomalies, and adapt to variances not present in standard digital models (e.g., aftermarket modifications, unique damage). For instance, when diagnosing a subtle vibration, the AI won't just pull an error code; it will instruct a humanoid (418) to use an acoustic sensor (504c) to pinpoint the vibration source, a thermal camera (504b) to check for localized overheating, and cross-reference these findings with historical data and OEM specifications for that specific vehicle make/model to pinpoint a likely failing component or an unusual wear pattern-providing transparent reasoning for its conclusion. For EVs, this extends to diagnosing cell degradation, battery cooling system faults, and anomalies in power electronics.
Autonomous Repair Strategy Generation Based on the identified issue, the AI (102, 306b) autonomously generates an optimal repair strategy, detailing the necessary steps, tools, parts, and humanoid robot motions.
Autonomous Physical Repair Execution with Dexterous Adaptation The humanoid robots (104) then execute these repair strategies (208; 408), performing precise manipulations such as component replacement, tightening, recalibration, or restoration. This includes adaptive dexterity informed by reinforcement learning, allowing robots to learn and apply optimal force, grip, and motion sequences to overcome real-world variability like corroded fasteners, stripped threads, or damaged wiring, ensuring successful and non-destructive intervention. They adapt to real-time feedback and unforeseen obstacles or conditions.

For EVs, this includes handling high-voltage cable connections with specialized end-effectors (510), performing battery pack module replacements, or precisely aligning electric motor components with integrated safety protocols for electrical isolation.

EXAMPLES

Paint Protection Film (PPF) Installation: The humanoid (104) first uses integrated 3D scanners and multi-modal sensors (504) to precisely map the vehicle surface and detect imperfections. Its dexterous hands (502), with integrated force (502a) and tactile sensors (502b), clean the surface, apply the film with calibrated tension, use a specialized squeegee end-effector (510) with controlled force feedback to eliminate air bubbles, and finally, utilize high-precision cutting tools guided by optical sensors to trim edges perfectly-adapting to subtle body contours and avoiding paint damage. Similar precision is applied to ceramic coatings and full vinyl wraps.

Engine Component Replacement: The humanoid (104), guided by the AI (102), uses a thermal camera (504b) to locate hot spots, precisely manipulates specialized wrenches with force feedback to loosen rusted bolts without stripping them, and carefully extracts and replaces components in confined spaces, adapting to misalignments or obstructions through real-time vision and tactile sensing. This demonstrates the system's broad applicability beyond surface treatments.
Repair Verification Post-repair, the humanoid robots (104) perform verification checks (214) to confirm the issue has been resolved and the vehicle is functioning correctly. This includes functional testing for EV-specific systems, such as battery pack voltage checks, charging cycle verification, and motor performance validation.
AI-Powered Customer Interaction and Real-Time Status Communication (Enhanced with Emotion/Sentiment & Social Cues)

The humanoid robots (104), integrated with the Central AI (102), handle customer-facing operations (402) with advanced capabilities, providing unparalleled transparency and engagement:
- Natural Language Processing (NLP) (306f) & Speech Recognition: Enables natural conversation, understanding customer requests, and providing information.
- Generative AI for Personalized Responses (306f): Creates tailored replies for customer inquiries, service explanations, and scheduling.
- Facial Recognition (with consent) & Voice Biometrics: Allows for personalized greetings and efficient customer identification.
- Automated Check-in/Check-out: Guides customers (120) through seamless vehicle drop-off and pickup, including secure key handling (110) and payment facilitation.

For EVs, robots can also autonomously connect/disconnect charging cables and manage charging schedules as part of the service intake and delivery process, capable of dynamic load balancing based on grid demand and electricity pricing, communicating with energy providers to optimize costs and minimize grid impact.

Proactive, Real-Time Communication on Car Status with Adaptive Social Cues (306k):
Contextual Updates: Details on the current service step.
Estimated Completion Times: Dynamically updated based on real-time progress and shop load.
Visual Aids: Displays on integrated robot screens (504d) (or portable tablets) showing live progress bars, diagnostic images, and animated repair explanations.
Interactive Q&A: Customers (120) may ask questions, answered in real time from the AI's knowledge base.
Problem Notification with Explanation: If a new issue is discovered, the robot (104) approaches the customer, explains the problem in simplified language, shows visual evidence, and offers repair options with estimated costs.
Emotion and Sentiment Recognition: Multi-modal sensing (vocal tone, facial micro-expressions) helps the robot adjust tone, vocabulary, and pacing based on the customer's emotional state.
Adaptive Social Cues: Adjustments in posture, gaze, and gesture make interactions feel intuitive and humanlike.
Personalized Handover: Robot returns keys and provides a detailed service summary and recommendations.

Advanced Multi-Modal AI and Adaptive Learning for Shop Operations (Enhanced with Digital Twins & Semantic Understanding)

The system's intelligence is powered by advanced AI (102), including ML, NLP (306f), and generative AI. These capabilities enable the humanoid robots (104) to:

Learn from Human Demonstrations (Imitation Learning): Acquire human skills for repair, interaction, and cleaning.
Optimize Multi-Robot Workflows (Reinforcement Learning) (306c): Efficiently sequence tasks, repair steps, collision avoidance, and peer-to-peer coordination. This includes:
Grip optimization on irregular components.
Tool disentanglement in tight spaces.
Autonomous fault recovery and assistive collaboration between robots.
Generate Synthetic Training Data (Generative AI) (306d):
Custom simulation of vehicles, parts, lighting, damage, and interaction scenarios.
Data pipeline integrates robot physics constraints with photorealistic environments.
Covers real-world anomalies (e.g., rust, grime, aftermarket parts), and continuously learns from human overrides and corrections, which are fed back into the AI's models to refine autonomous decision-making and enhance future performance.
Real-Time Adaptive Control (306e): Continuously processes sensory feedback for responsive motor control.
Digital Twin Monitoring: Real-time replica of both the vehicle (118) and shop environment allows:
Predictive maintenance and failure simulation.
Continuous monitoring of robots (104), tools (112), and shop equipment.
This extends to predicting the lifespan of specific vehicle components (e.g., battery cells, brake pads, electric motors) based on usage patterns, environmental factors, and historical data, facilitating proactive part ordering and customer scheduling.
Semantic Environmental Understanding: Recognizes object identity and function (e.g., "spilled fluid" triggers cleanup protocol).
Geospatial Mapping & Zone Management (306l):
Shop owners set operation boundaries.
AI enforces robot containment within zones (FIG. 6, 612).
Prevents tool loss or robot trespass beyond defined limits.
Shop Logistics Optimization (306h):
Tracks inventory, tool usage, and location.
Reorders supplies automatically.
Organizes shop layout for humanoid access.
The system also employs continuous visual and RFID/UWB tracking of all vehicles, parts (both new and installed), and tools across the entire property, including the outdoor lot.
This eliminates 'lost' items or components from half-finished jobs, drastically reducing inventory shrinkage and ensuring all assets are accounted for.
Diagnostic & Repair Strategy Generation (306i):
Ingests OBD-II codes, sensor inputs, OEM records.
Uses deep learning and XAI to explain conclusions and suggested repairs.
Security & Anomaly Detection (306j):
Monitors for unauthorized access or unusual behavior.
Detects forced entry or tampering.
The AI's continuous monitoring extends to ensuring adherence to defined operational protocols, automatically flagging and responding to deviations, thereby eliminating issues related to human non-compliance or impaired performance.
This also includes detecting and responding to attempts to compromise physical robot actions via cyber means, ensuring operational integrity.
Customer Communication Management (306k):
Orchestrates when/how robots contact customers.
Integrates sentiment data to customize delivery.
This includes providing highly personalized, proactive service reminders based on predicted component lifespans and vehicle data.
Autonomous Navigation (306g):
Supports indoor/outdoor operation with bipedal locomotion (506).
Plans safe, efficient paths in dynamic settings.
On-Device AI (508): Local models on robots ensure operation without cloud dependency.
Cyber-Physical Security: Secure boot, intrusion detection, and end-to-end encryption safeguard all communications.
Autonomous Project Triage and Completion:
The Central AI (102) can analyze the status of previously unfinished vehicles (e.g., identifying missing parts or assessing necessary repairs from partially completed jobs), generating prioritized completion plans.
Humanoid robots (104) can then systematically retrieve, re-diagnose, and complete these projects, turning stalled assets into revenue-generating outcomes.

Operational Process

Figure 2:
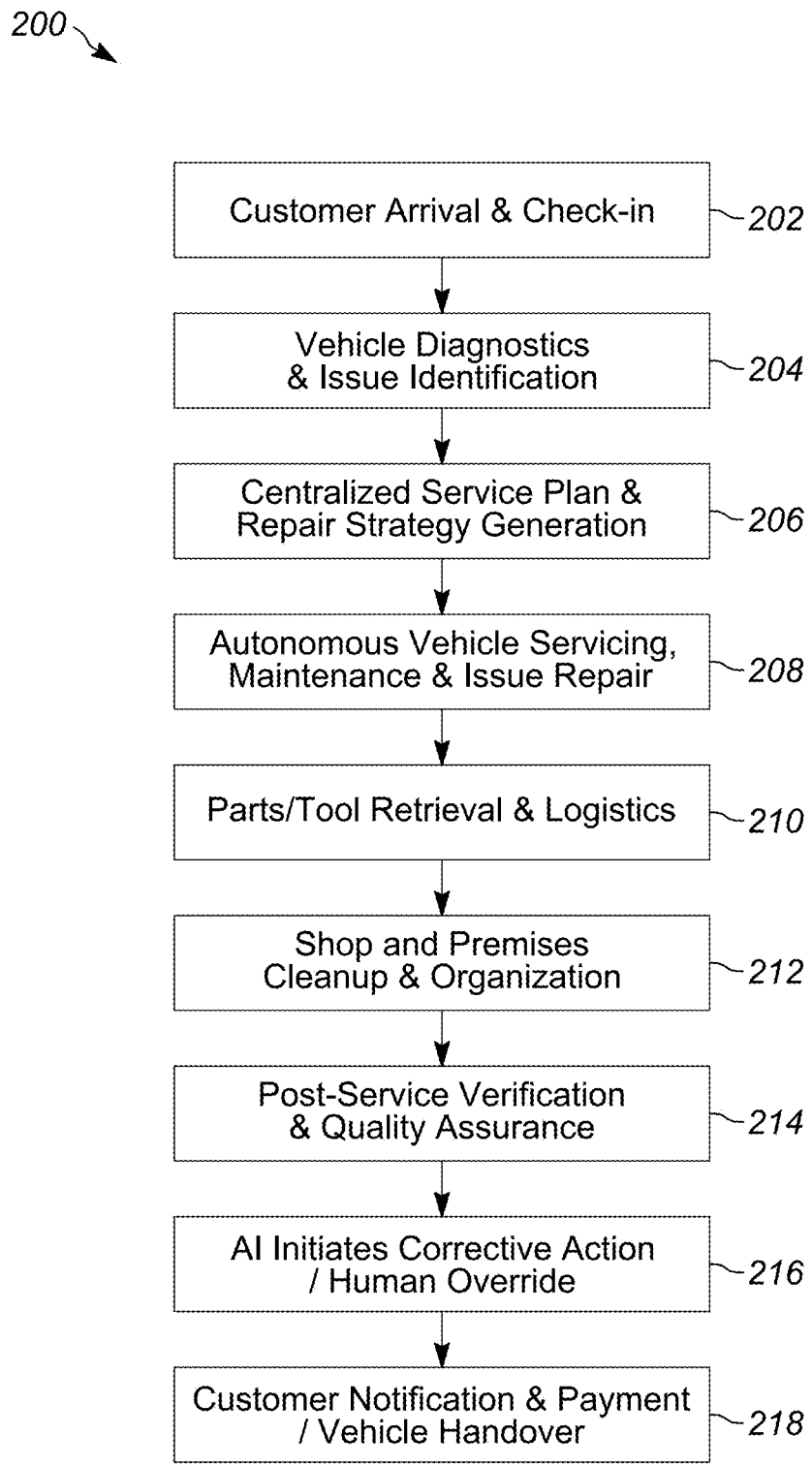
FIG. 2 is a flowchart (2/6) illustrating the General Operational Workflow (200) of the Auto Wrap Robotics Humanoid Service Center System, representing the main step-by-step stages of service operation. These stages include: Customer Arrival & Check-in (202); Vehicle Diagnostics & Issue Identification (204); Centralized Service Plan & Repair Strategy Generation (206); Autonomous Vehicle Servicing, Maintenance & Issue Repair (208); Parts/Tool Retrieval & Logistics (210); Shop and Premises Cleanup & Organization (212); Post-Service Verification & Quality Assurance (214); AI Initiates Corrective Action/Human Override (216); Customer Notification & Payment/Vehicle Handover (218).
Figure 3:
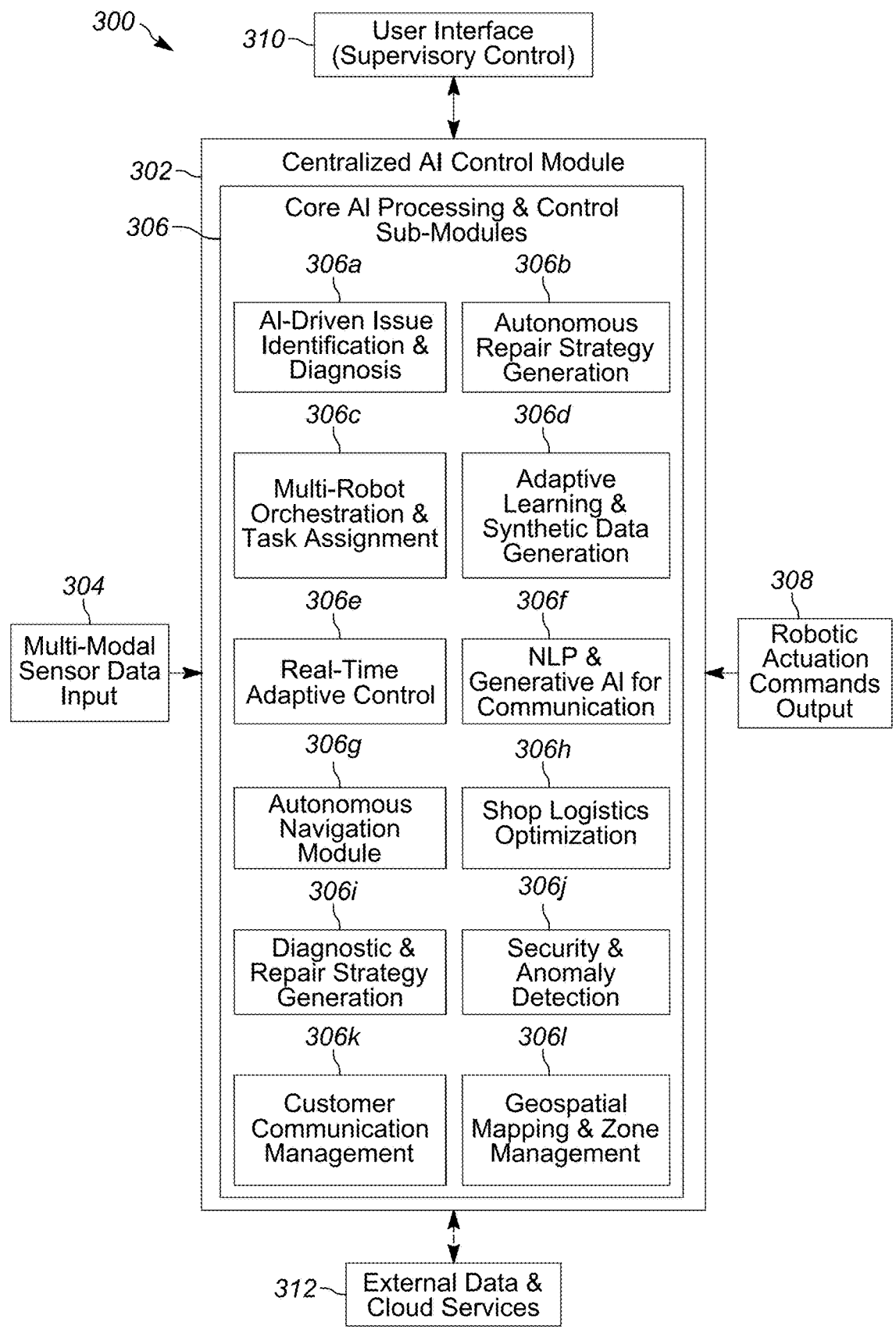
FIG. 3 is a block diagram (3/6) depicting the Detailed AI Control Platform Architecture (300) of the Centralized AI Control Platform (102), showing the main components and their connections. It includes: Centralized AI Control Module (302); Multi-Modal Sensor Data Input (304); Core AI Processing & Control Sub-modules (306) including: AI-Driven Issue Identification & Diagnosis (306a); Autonomous Repair Strategy Generation (306b); Multi-Robot Orchestration & Task Assignment (306c); Adaptive Learning & Synthetic Data Generation (306d); Real-time Adaptive Control (306e); Natural Language Processing (NLP) & Generative AI for Communication (306f); Autonomous Navigation Module (306g); Shop Logistics Optimization (306h); Diagnostic & Repair Strategy Generation (306i); Security & Anomaly Detection (306j); Customer Communication Management (306k); Geospatial Mapping & Zone Management (306l); Robotic Actuation Commands Output (308); User Interface (Supervisory Control) (310); External Data & Cloud Services (312).

The AutoWrap Robotics Humanoid Service Center System executes diverse, comprehensive shop operations through a meticulously orchestrated, multi-stage autonomous process (see FIG. 2 (200), FIG. 4 (400)), applicable to both fixed facilities and mobile/on-site deployments.

Customer Reception, Check-In, and Vehicle Diagnostics & Issue Identification

Check-In (202, 402):
Humanoid (418) greets customer (120) using NLP and verifies appointments (e.g., facial recognition or license plate scanning with consent). Collects vehicle issue symptoms. Accepts key and places it in a secure, AI-tracked key vault (110).

Vehicle Diagnostics (204, 404):
Another humanoid (418) conducts a multi-modal scan (visual, thermal, acoustic, underbody, engine). Connects to OBD-II via Vehicle Diagnostic Port (114) to retrieve codes and live data. Central AI (102) analyzes sensor and historical data to pinpoint faults and potential failures. AI adapts to non-standard vehicles (e.g., aftermarket parts, unusual wear). The system can integrate with Vehicle-to-Infrastructure (V2I)/Vehicle-to-Everything (V2X) data streams to perform predictive maintenance diagnostics before a vehicle even arrives at the service center.

Centralized Service Plan & Repair Strategy Generation and Task Assignment

Central AI (102, 206, 406) generates a multi-step repair plan including parts, tools, sequencing. Repairs adapt in real time for unexpected conditions (e.g., rusted bolts).

For truly novel or ambiguous failures that the AI cannot diagnose with high confidence, the system generates a detailed data package for human review and decision-making, marking these cases for human final approval.

Humanoid Robot Assignment: Robots (104) are selected based on location, workload, and capabilities. Tasks include vehicle prep, parts retrieval (410), repair (408). In case of failure, AI reassigns tasks and dispatches support robots for retrieval or obstruction clearing.

The system ensures consistent, high-speed execution, eliminating human variability, fatigue, and external factors like absenteeism or unreliability that plague traditional labor forces. This leads to predictable completion times and a significant increase in daily vehicle throughput, maximizing the utilization of fixed assets like service bays (118) and external lot space.

Autonomous Vehicle Servicing, Logistics, and Premises Maintenance

Repair Execution (208, 406, 408, 410, 412): Humanoids (420) enter work zones, lift vehicles (or assist with lift), remove covers, and complete repairs using end-effectors (510). Adjust grip, pressure, and motion dynamically in response to real-time sensor feedback.

Parts & Tool Retrieval (210, 410):
Other robots (422) fetch components, handle used oil, dispose waste. Deliver required tools with precision from Automated Tool Magazine (112)/Part Storage (424).

Facility and Outdoor Cleaning (212, 416):
Humanoids (104) sweep, mop, organize inside the shop. Outdoor robots (602) clean customer areas, stay within defined zones (612) (see FIG. 6). Lawn care and lot cleaning performed with interchangeable tools (604).

In particular, for facilities previously suffering from disorganization or neglect, the humanoids autonomously perform comprehensive clean-up, including sweeping and debris removal (614) from parking lots (606), organizing vehicle staging areas to maximize space utilization, and systematically clearing abandoned or half-finished projects to restore order and efficiency to the entire property. The system also supports automated segregation and recycling of fluids, batteries, and other materials for enhanced sustainability.

Post-Service Verification, Quality Assurance, and Customer Handover

Throughout and following service, multi-modal sensors (106) perform real-time quality checks (e.g., Defects/Anomalies Detected & Repair Verification (214), AI Initiates Corrective Action/Human Override (216)). These procedures include:

Verifying component security and part reassembly.

Confirming issue resolution through functional testing (e.g., engine start/stop, thermal behavior, vibrations).

Leak detection using pressure, visual, or chemical sensors.

Post-repair scans to ensure no new anomalies have been introduced.

Confirming fluid levels, brake integrity, and torque values.

Adherence to OEM specifications and service standards.

The Central AI (102) orchestrates a final diagnostic verification to confirm all identified issues are fully resolved. In the event of post-repair anomalies, the AI attempts correction autonomously. If unresolved, a human supervisor (428) is notified, and a support robot may be dispatched for escalation or reassignment.

Upon successful verification:

The AI initiates Customer Notification & Payment (414).

A humanoid robot (104) guides the customer (120) through pickup, explains work completed, and facilitates secure digital payment.

The robot retrieves and delivers the physical key from a secure storage system (110) using built-in authentication (e.g., facial or voice ID, passcode).

A verbal summary is provided, including identified issues, work performed, any recommendations, and post-service care tips.

Full digital documentation is generated and automatically logged for:
Internal quality control and audits
Model training and error reduction
Customer records and warranty documentation Security and Safety Protocols The AutoWrap Robotics Humanoid Service Center System (100) integrates a multi-layered security and safety framework to protect against unauthorized access, theft, system sabotage, and to ensure operational safety for all personnel and assets. The system operates continuously with proactive monitoring and real-time response capabilities, including:

Real-Time Detection and Anomaly Identification:
Facility perimeter is monitored by humanoid robots' integrated 3D vision (504*a*), ambient light sensors, and thermal imaging (504*b*). Access control systems (e.g., RFID, biometric gates) are linked to robot alert protocols. AI-powered behavioral anomaly detection (306*j*) continuously analyzes data for unusual events such as:
Unauthorized access attempts
Tampering with vehicles or equipment
Prolonged idle behavior of humans or robots
Internal robot diagnostics constantly assess the operational state of each robot. If a robot malfunctions, goes offline, or deviates from expected behavior, alerts are sent and the system automatically reassigns its tasks to maintain service flow.

Immediate Deterrence and De-escalation by Humanoid Robots:
  Upon detecting anomalies, nearby humanoid robots (104) respond with clear verbal warnings to the intruder or subject. They can autonomously reposition themselves to block access or pathways—non-aggressively—without initiating physical contact. Robots dynamically adjust posture, stance, and voice tone depending on escalation level. Critical systems such as vehicle lifts, engine starts, and tool operations can be locked or halted if misuse is detected. Vehicle movement outside geo-fenced boundaries (612) is prohibited. AI enforces virtual perimeters and will block, warn, or stall unauthorized vehicle exit attempts.

Activating Shop Security Features:
  Central AI (102) can trigger physical security mechanisms, including:
    Door and gate locks
    Shop floor alarms
    Enhanced LED illumination
    Robotic alert patrols in high-risk zones Immediate Alerts and Human Intervention:
  Real-time alert notifications with video/sensor feeds are dispatched to:
    Remote shop supervisors (428)
    Local or central security personnel
    Law enforcement (if configured)·
  Human operators can take remote control of robots or override AI decisions using a secure AR interface (108, 310), issuing commands via authenticated channels.

Preventative Measures:
  Secure Key Handling: Automated key vault (110) with biometric or passcode access logs every interaction.
  Restricted Storage Zones: High-value parts and customer vehicles are stored in zones with access restricted to authenticated humanoids.
  Immutable Digital Audit Trail: All operations—robotic, human, mechanical—are logged via digital twins, with access history, location, and action metadata.
  Cyber-Physical Security Framework: AES-256 encryption for all data in transit and at rest. Role-Based Access Control (RBAC) for all robot and human operators. Secure boot, firmware authentication, and network isolation prevent hacking or unauthorized manipulation. Robots are geospatially sandboxed: operate only within approved zones. Breach attempts trigger immediate halt and alerts. External override is impossible without multi-factor authentication.

The system further ensures secure vehicle network access, explicitly managing interaction with Vehicle Diagnostic Port (114) (CAN bus systems, OBD-II ports, and proprietary diagnostic interfaces) to prevent unauthorized access or injection of malicious code. It also safeguards the integrity of software updates for both the robots and the vehicles they service against corrupted firmware, providing robust supply chain security for software and hardware.

Advanced Capabilities

The AutoWrap Robotics Humanoid Service Center System (100) distinguishes itself through several advanced capabilities enabling high performance and adaptability across the entire service operation:

Comprehensive Dexterity and Adaptive Manipulation:
  As described in [0023], enabling fine motor control and robust adaptation to real-world variability, significantly enhanced by reinforcement learning for complex, dynamic physical manipulation tasks. This allows robots to master nuanced operations such as delicate wiring or stubborn fastener removal.

Advanced Multi-Modal AI and Adaptive Learning:
  Includes Explainable AI (XAI) for transparent diagnostics and repair reasoning, semantic environment understanding, and use of Digital Twins for enhanced simulation, monitoring, and predictive analysis ([0025]).

Force Control for Delicate Component Handling and Safe Interaction:
  Ensures precise, compliant physical interactions ([0023]).

Seamless Human-Humanoid Robot Collaboration Beyond Safety (Enhanced with AR):
  This extends beyond basic safety-rated stops to enable active, intelligent collaboration between human technicians or supervisory staff (428) and humanoid robots (104) for complex and non-routine tasks. For highly complex repairs, human experts may:
    Guide humanoid robots through unknown scenarios via teleoperation.
    Provide on-the-fly demonstrations for imitation learning.
    Receive real-time, AR-assisted sensor data to assist with remote diagnosis and decision-making.
  AR overlays via smart glasses for supervisors may:
  Show real-time performance metrics.
  Highlight components on a vehicle.
  Project virtual repair instructions directly onto the workspace.

This hybrid model scales human expertise efficiently, focusing human effort on cognitive decision-making while humanoids execute precision tasks. Supervisors can dynamically assign or oversee humanoid operations via the centralized user interface (108, 310), enabling a "team mate collab" paradigm where robotic precision augments human ingenuity.

Intelligent Power Management for Fleet and Mobile Deployments:
  Optimizes energy consumption and supports sustained operation using:
    Autonomous navigation to charging stations.
    Auxiliary power sources and energy harvesting within the facility.
    Real-time monitoring of power states across the fleet.

Environmental Robustness for Full Shop Coverage:
  Supports reliable operation in diverse indoor and outdoor settings, including variable weather, lighting, and terrain conditions.

Centralized Fleet Management and Remote Diagnostics:
  Provides unified monitoring and control of:
    Software updates.
    Diagnostic reports.
    Task allocation across the entire humanoid fleet.
  Extends to predictive maintenance of both:
  Humanoid robots (e.g., joint wear, sensor degradation).
  Shop equipment (e.g., lifts, compressors, tools).
  Supports automatic failure diagnosis, peer-to-peer robot support, and real-time task reassignment.

Data-Driven Predictive Maintenance and Shop Optimization:

Utilizes continuous operational data to:
  Anticipate vehicle issues.
  Improve repair strategies.
  Optimize resource allocation and customer flow.
  Refine real-time performance across service operations.
This includes integrating with Vehicle-to-Infrastructure (V2I) and Vehicle-to-Everything (V2X) data streams for granular component lifespan prediction, enabling proactive customer scheduling and part ordering.
Cyber-Physical Security for End-to-End Protection:
  Provides safeguards for sensitive vehicle and operational data via:
    AES-256 encryption for all data in transit and at rest.
    Multi-Factor Authentication (MFA) for supervisory interface access.
    Role-Based Access Control (RBAC) for user-specific data/function permissions.
    Immutable audit logs to track access, edits, and robot actions.
    Compliance mechanisms for global privacy laws (e.g., GDPR, CCPA), including data anonymization and consent capture for features like facial recognition.
It further protects against cyber-physical attacks by detecting and responding to attempts to compromise physical robot actions via cyber means, ensuring robots do not perform unsafe actions if their control systems are maliciously altered.
Potential for Blockchain Integration:
  System architecture supports future integration with blockchain for:
    Supply chain transparency.
    Immutable parts provenance records.
    Verification of ethical sourcing.
    Distributed ledger-based inventory management and trust frameworks.
Autonomous Outdoor Premises Management:
  As described in (and shown in FIG. 6), humanoid robots autonomously clean and maintain external zones (e.g., customer drop-off, parking areas) within geo-fenced boundaries.
Humanoid-Mediated Real-Time Customer Communication:
  As described in [0024], enables:
    Real-time updates.
    Status summaries.
    Visual and verbal interaction.
    Emotion/sentiment-aware engagement and interactive Q&A.
This includes providing highly personalized service reminders based on predictive maintenance insights.
Adaptability to Evolving Technologies and Standards (Future-Proofing):
  The system's modular software architecture and hardware-agnostic AI control:
    Uses standardized robotics middleware interfaces.
    Abstracts hardware-specific control through modular APIs.
    Allows seamless upgrades to new humanoid platforms or AI algorithms.
    Supports integration of advanced sensing, microrobotics, or endoscopic tools for intricate repair tasks.
    Adapts to new vehicle diagnostic standards and IoT protocols without system overhaul.
Economic Advantages/Impact:
  Delivers significant economic benefits by:
    Reducing labor costs through autonomous operations.
    Enabling 24/7 operation without human fatigue or downtime.
    Minimizing human error and rework.
    Executing parallel tasks efficiently across the humanoid fleet.
    Converting capital expenditure into operational expense via SaaS delivery.
    Lowering adoption barriers through scalable, replicable deployments.
    Enabling mobile expansion and on-site services to broaden market reach.
By enabling 24/7 autonomous operation and significantly increasing throughput per bay (e.g., processing X vehicles per day compared to Y manually), the system transforms underutilized assets into highly productive revenue streams. For a 4-bay garage on a $3.6M lot, this translates directly into optimizing asset utilization, drastically improving return on investment, and rapidly increasing the overall valuation of the operational business and its underlying real estate.
Additionally, the system generates vast amounts of anonymized and aggregated diagnostic and repair data, which can provide valuable industry insights into vehicle reliability, common failure points, and service trends, potentially creating an additional revenue stream with strict adherence to privacy protocols and user consent.
Adaptability to Evolving Legal and Regulatory Landscape:
  Designed to meet emerging standards for:
    Data privacy
    AI transparency
    Autonomous system liability
    Human-in-the-loop override protocols
  With:
    Explicit consent mechanisms
    Modular logging and audit trails
    Real-time human detection and emergency overrides
  The system is designed to adhere to relevant robotics safety standards (e.g., ISO 13482 for personal care robots, ISO/TS 15066 for collaborative robots) and incorporates mechanisms to align with the "Right to Repair" movement by providing transparent diagnostic and repair information. It ensures compliance while supporting transparency, accountability, and public trust.
Sustainability and Environmental Impact:
  The system promotes environmental responsibility by:
    Automating the precise segregation and recycling of fluids, high-voltage batteries, and other materials.
    Optimizing energy consumption within the service center (e.g., smart lighting, HVAC, automated tool charging based on scheduling and robot movement).
    Facilitating the use and tracking of recycled or remanufactured parts and eco-friendly cleaning agents.
Ethical AI Design Principles
  The system is built upon core ethical AI principles, including:
    Transparency through Explainable AI that clarifies decision-making processes;
    Accountability ensured by immutable audit logs and active human oversight;

Fairness via bias mitigation strategies implemented through diverse training data and monitoring for algorithmic bias;

Privacy protected by robust encryption and user consent mechanisms for all collected data, including biometric and connected vehicle information;

Safe Human-Robot Collaboration achieved through non-aggressive interactions and adaptive social cues that prioritize human well-being.

BEST MODE FOR CARRYING OUT THE INVENTION

The best mode comprises a synergistic integration of advanced commercially available humanoid robots (104)—such as Apptronik Apollo, Agility Robotics Digit, Figure AI FIG. 02, and Tesla Optimus—combined with a Central AI system (102). This AI system leverages:

Multi-modal machine learning techniques, including proprietary synthetic data generation (306d), imitation learning, and reinforcement learning (306c) (including strategies for autonomous robot fault recovery and peer-to-peer assistance);

Comprehensive sensing modalities (106; 504) (3D LiDAR, tactile, force/torque, thermal, acoustic);

Multi-functional interchangeable end-effectors (510) and automated tool management (112, 424), enabling versatile physical interactions.

The Central AI (102) orchestrates:

Multi-robot coordination (306c; FIG. 4)

Customer interaction with emotion and sentiment recognition (306k)

Vehicle diagnostics using Explainable AI (306a) (including for ICE, EV, and SDVs from 2005 onwards)·

Repair strategy generation and execution (306b)

Logistics optimization (306h), including predictive maintenance via V2X data integration Autonomous management of facilities and outdoor premises (FIG. 6)

Multi-layered security and safety protocols (306j), including secure key handling (110) and potential blockchain-based supply chain integration, along with secure vehicle network access and cyber-physical attack mitigation.

Operational procedures support a broad range of maintenance and repair tasks, adaptable for both fixed facilities and mobile deployments. The system facilitates rapid, coordinated multi-robot and human-robot collaboration, often augmented with augmented reality (AR) interfaces (108, 310) for supervisors (428).

The overall system architecture ensures:

Data security

Environmental resilience

Power management

Fleet monitoring

Sustainability and adherence to relevant safety and data governance standards.

Delivered as a scalable Software-as-a-Service (SaaS) platform, the invention enables replication and expansion across diverse service environments.

The invention claimed is:

1. A computer-implemented artificial intelligence (AI) system for autonomously managing a vehicle service center using a fleet of humanoid robots, comprising:
a centralized AI control module (102), a fleet sensing module (106), and a robotic actuation module (308) configured to:
   a. receive and analyze multi-modal sensor data (304) and vehicle diagnostics (204), including specialized diagnostics for Electric Vehicles (EVs) and Software-Defined Vehicles (SDVs) from model year 2005 onwards;
   b. identify vehicle issues and generate explainable AI (XAI)-based repair strategies (306a, 306b);
   c. generate and dispatch a service plan (206) to humanoid robots (104) with dynamically assigned roles (306c);
   d. adapt control commands (308) based on real-time environmental feedback (306e);
   e. update and manage a digital twin of a vehicle (118) and service center (100);
   f. constrain humanoid robot operation to user-defined geospatial boundaries (306I, 612);
   g. provide customer updates (218) via humanoid robots (104) using emotion and sentiment recognition (306k) algorithms;
   h. detect and respond to security threats (306j), including autonomously detecting and responding to malfunctions or offline states of individual humanoid robots within said fleet by re-allocating tasks and dispatching assisting robots for recovery or removal operations;
   i. learn humanoid robotic behaviors using synthetic training data (306d) and reinforcement learning (306c); and
   j. optimize asset utilization by dynamically managing external vehicle staging areas (606) and internal service bays (118) to maximize throughput and revenue generation from the service center property, including systematically identifying, triaging, and completing previously unfinished vehicle service projects.

2. The system of claim 1, wherein humanoid robot roles include: customer check-in (202), payment (218), diagnostics (204), physical repair (208), logistics (210), outdoor maintenance (212, 600), and security monitoring (306j).

3. The system of claim 1, wherein the humanoid robots (104) are equipped with multi-degree-of-freedom hands (502) containing force sensors (502a) and tactile sensors (502b) for fine manipulation and human-safe interaction, including handling high-voltage EV components with specialized safety protocols.

4. The system of claim 1, wherein humanoid robot control includes autonomous selection and operation of interchangeable end-effectors (510) from a centralized automated tool magazine (112), with said end-effectors capable of self-diagnosis for wear and calibration drift.

5. The system of claim 1, further comprising a user interface (108, 310) configured to: monitor humanoid robot operations, assign priority tasks, override behavior, review logs, and configure geospatial boundaries using augmented reality overlays.

6. The system of claim 1, wherein the AI control module (102) includes a cyber-physical security framework with: AES-256 encryption, role-based access control (RBAC), immutable audit logs, and blockchain-based supply chain integration.

7. The system of claim 1, wherein emotion and sentiment recognition is performed via natural language processing, facial micro-expression analysis, and vocal tone analysis.

8. A computer-implemented method for autonomously operating a vehicle service center with humanoid robots, comprising:
   a. receiving a customer request (202) and scanning a vehicle with multi-modal sensors (204), including specialized scans for Electric Vehicle (EV) battery health and thermal management;
   b. generating a digital twin of a vehicle and service center facility;

c. identifying service issues using explainable AI (XAI) reasoning (204);
d. creating and dispatching a multi-task service plan (206) constrained by geospatial boundaries (612);
e. coordinating a humanoid robot fleet (104) to perform repair (208, 408), logistics (210, 410), and customer interaction tasks (202, 402), said coordination including autonomously detecting and responding to malfunctions or offline states of individual humanoid robots within the humanoid robot fleet by re-allocating tasks and dispatching assisting humanoid robots for recovery or removal operations;
f. generating adaptive control commands in real time using sensor feedback;
g. conducting quality control (214) and updating machine learning models;
h. providing customer updates (218) using emotion-aware humanoid interactions;
i. logging all operational data;
j. detecting and responding to security events autonomously;
k. autonomously managing and re-organizing external vehicle storage and staging areas (606) to enhance operational flow and maintain property aesthetics through upkeep of customer-facing areas; and
l. systematically identifying, triaging, and completing previously unfinished vehicle service projects.

9. The method of claim 8, wherein the humanoid robots (104) autonomously drive a vehicle into a service bay (118) or guide it onto an automated lift system, and can connect/disconnect EV charging cables and manage charge scheduling, including dynamic load balancing based on grid demand and electricity pricing.

10. The method of claim 8, wherein the humanoid robots (104) use semantic understanding to interpret and manipulate objects in the environment.

11. The method of claim 8, wherein the humanoid robots (104) perform real-time natural language conversations with customers (120), adapting tone and gestures based on detected sentiment.

12. The method of claim 8, wherein vehicle status updates (218) are visually displayed on humanoid robot interfaces (504*d*), including annotated diagnostic visuals and live progress bars.

13. The method of claim 8, further comprising automated key intake, storage, and retrieval via secure compartments (110).

14. A non-transitory computer-readable medium storing instructions that, when executed by one or more processors, cause a system to:
a. receive service requests and sensor data, including data from connected vehicle streams via vehicle-to-x (V2X) communications for predictive maintenance;
b. identify vehicle faults and generate explainable AI (XAI)-based repair strategies, including for EV powertrains and high-voltage systems;
c. create and dispatch a task plan to humanoid robots with adaptive command generation;
d. monitor humanoid robot performance and environment feedback in real time, including detecting malfunctions or offline states of individual humanoid robots and initiating autonomous response protocols for task re-allocation and peer-to-peer assistance;
e. constrain all movement to user-defined geospatial boundaries;
f. manage emotion-aware customer interactions via humanoid agents;
g. update a digital twin of a vehicle and a service center for simulation, monitoring, and predictive maintenance;
h. log all operations and performance data; and
i. detect and respond to unauthorized access or anomalies, including cyber-physical attacks aimed at compromising humanoid robot actions or vehicle networks.

15. The computer-readable medium of claim 14, wherein reinforcement learning is applied to humanoid robot training for dynamic physical manipulation in vehicle repair scenarios.

16. The computer-readable medium of claim 14, further comprising integration with a synthetic data engine (306*d*) that simulates diverse vehicles, components, lighting, and damage types for training, including EV-specific components and charging scenarios, and continually incorporates human overrides and corrections to improve autonomous decision-making.

17. The computer-readable medium of claim 14, wherein user interaction history and customer preferences are used to adapt humanoid robot behavior in future sessions.

18. The computer-readable medium of claim 14, wherein humanoid robot navigation (306*g*) includes obstacle detection and path planning using LiDAR, stereo vision, and semantic map overlays.

19. The computer-readable medium of claim 14, wherein system logs are periodically hashed and stored on a blockchain to enable verifiable audit trails for compliance and trust.

20. The computer-readable medium of claim 14, wherein the instructions further cause the system to perform coordination of multi-humanoid robot collaboration (306*c*, 400), including joint manipulation tasks, human-robot cooperation, and augmented reality-assisted human oversight (108, 310, 428).

\* \* \* \* \*